United States Patent
Youngblood et al.

(10) Patent No.: US 12,492,773 B2
(45) Date of Patent: Dec. 9, 2025

(54) WYE CONNECTOR FOR A PLURALITY OF DEVICES CONNECTED TO A FLUID SOURCE

(71) Applicant: Sleep Solutions Inc., Wilmington, DE (US)

(72) Inventors: Tara Youngblood, Mooresville, NC (US); Todd Youngblood, Mooresville, NC (US); Matthew Holling, Mooresville, NC (US)

(73) Assignee: Sleep Solutions Inc., Wilmington, DE (US)

( * ) Notice: Subject to any disclaimer, the term of this patent is extended or adjusted under 35 U.S.C. 154(b) by 252 days.

(21) Appl. No.: 18/211,441

(22) Filed: Jun. 19, 2023

(65) Prior Publication Data

US 2023/0408014 A1 Dec. 21, 2023

Related U.S. Application Data

(60) Provisional application No. 63/353,754, filed on Jun. 20, 2022.

(51) Int. Cl.
| | |
|---|---|
| *F16L 41/02* | (2006.01) |
| *F16L 33/30* | (2006.01) |
| *F16L 53/34* | (2018.01) |
| *A47C 21/04* | (2006.01) |
| *A47G 9/10* | (2006.01) |

(52) U.S. Cl.
CPC ............ *F16L 41/023* (2013.01); *F16L 33/30* (2013.01); *F16L 53/34* (2018.01); *A47C 21/048* (2013.01); *A47G 9/1036* (2013.01)

(58) Field of Classification Search
CPC ......... F16L 41/023; F16L 53/34; F16L 33/30; A47C 21/048; A47C 21/044; A47C 21/04; A47G 9/1036; A47G 9/0215
See application file for complete search history.

(56) References Cited

U.S. PATENT DOCUMENTS

| | | | |
|---|---|---|---|
| 6,481,216 B2 | 11/2002 | Simmons et al. | |
| 9,901,008 B2 | 2/2018 | Shedd et al. | |
| 10,667,622 B1* | 6/2020 | Youngblood | ........... F25B 21/04 |
| 2022/0125217 A1* | 4/2022 | Connor | ................ A47C 27/061 |

FOREIGN PATENT DOCUMENTS

KR   20130115635 A   * 10/2013   ............. F16L 37/00

\* cited by examiner

*Primary Examiner* — Joseph F Trpisovsky
(74) *Attorney, Agent, or Firm* — Cozen O'Connor

(57) ABSTRACT

The present invention is directed to a wye connector for use in fluidly coupling two or more thermally regulated articles to a fluid source. The wye connector includes quick disconnect elements attachable to a corresponding quick disconnect element attached to the fluid source and/or to the two or more thermally regulated articles, and a plurality of tubes connecting each quick disconnect element. The tubes connecting each quick disconnect element are attached to at least one thermoelectric module capable of heating and/or cooling fluid moving through the tubes.

20 Claims, 5 Drawing Sheets

WYE CONNECTOR FOR A PLURALITY OF DEVICES CONNECTED TO A FLUID SOURCE

CROSS REFERENCE TO RELATED APPLICATIONS

This application relates to and claims priority from the following applications. This application claims the benefit of U.S. Provisional Patent Application No. 63/353,754, filed Jun. 20, 2022, which is incorporated herein by reference in its entirety.

BACKGROUND OF THE INVENTION

1. Field of the Invention

The present invention relates to fluid connectors, and more specifically to a wye connector for connection of multiple devices to one or more fluid sources.

2. Description of the Prior Art

It is generally known in the prior art to provide wye splitters for splitting a single fluid path into multiple fluid paths. Additionally, it is known to recombine the multiple fluid paths into a single fluid path such that the multiple fluid paths and the single fluid path form a contained, continuous circuit loop of flowing fluid.

Prior art patent documents include the following:

U.S. Pat. No. 9,901,008 for Redundant heat sink module by inventors Shedd et al., filed Feb. 17, 2015 and issued Feb. 20, 2018, discloses a redundant heat sink module including a first independent coolant pathway and a second independent coolant pathway. The first independent coolant pathway can include a first inlet chamber, a first outlet chamber, and a first plurality of orifices extending from the first inlet chamber to the first outlet chamber and providing a first plurality of impinging jet streams of coolant against a first region of a surface to be cooled when pressurized coolant is provided to the first inlet chamber. The second independent coolant pathway can include a second inlet chamber, a second outlet chamber, and a second plurality of orifices extending from the second inlet chamber to the second outlet chamber and providing a second plurality of impinging jet streams of coolant against a second region of the surface to be cooled when pressurized coolant is provided to the second inlet chamber.

U.S. Pat. No. 6,481,216 for Modular eutectic-based refrigeration system by inventors Simmons et al., filed Jul. 30, 2001 and issued Nov. 19, 2002, discloses a refrigeration system for chilling an enclosure. The system may include a thermal transfer pathway with a cold producing unit and a thermal storage unit connected to the pathway via a number of quick disconnect fittings.

SUMMARY OF THE INVENTION

The present invention relates to fluid connectors, and more specifically to a wye connector for connection of multiple devices to one or more fluid sources.

It is an object of this invention to provide fluid coupling between a fluid source and two or more thermally regulated articles such that the fluid source and the two more thermally regulated articles form a closed fluid circuit.

In one embodiment, the present invention is directed to a connector element for connecting a control unit to a plurality of temperature-regulated articles, including at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first fluid conduit connecting a fluid outlet of the at least one primary connector to a fluid inlet of a first one of the plurality of secondary connectors, at least one second fluid conduit connecting a fluid outlet of the first one of the plurality of secondary connectors to a fluid inlet of the second one of the plurality of secondary connectors, at least one third fluid conduit connecting a fluid inlet of the at least one primary connector to a fluid outlet of a second one of the plurality of secondary connectors, and at least one heating module configured to heat fluid within the at least one first fluid conduit and/or the at least one second fluid conduit.

In another embodiment, the present invention is directed to a connector element for connecting a control unit to a plurality of temperature-regulated articles, including at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first tube connecting a fluid outlet of the at least one primary connector to a fluid inlet of a first one of the plurality of secondary connectors, at least one second tube connecting a fluid inlet of the at least one primary connector to a fluid outlet of a second one of the plurality of secondary connectors, and at least one heating module configured to heat fluid within the at least one first tube.

In yet another embodiment, the present invention is directed to a system for heating or cooling a plurality of temperature-regulated articles with a single control unit, including a control unit, a plurality of temperature-regulated articles, at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first fluid conduit connecting a fluid outlet of the at least one primary connector to a fluid inlet of a first one of the plurality of secondary connectors, at least one second fluid conduit connecting a fluid outlet of the first one of the plurality of secondary connectors to a fluid inlet of the second one of the plurality of secondary connectors, at least one third fluid conduit connecting a fluid inlet of the at least one primary connector to a fluid outlet of a second one of the plurality of secondary connectors, and at least one heating module configured to heat fluid within the at least one first fluid conduit and/or the at least one second fluid conduit.

These and other aspects of the present invention will become apparent to those skilled in the art after a reading of the following description of the preferred embodiment when considered with the drawings, as they support the claimed invention.

DETAILED DESCRIPTION

Figure 1:
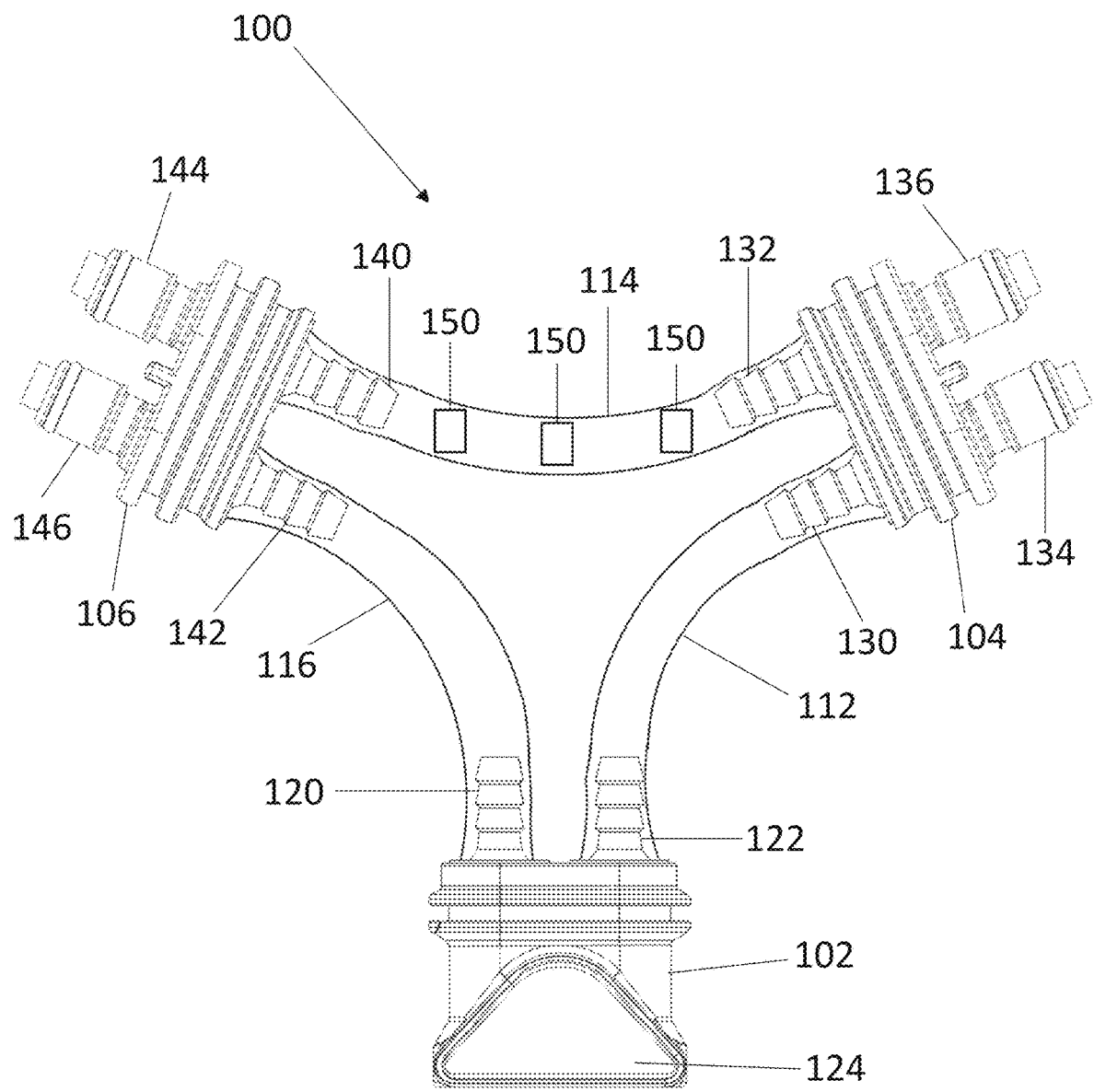
FIG. 1 illustrates a wye connector according to one embodiment of the present invention.

The present invention is generally directed to fluid connectors, and more specifically to a wye connector for connection of multiple devices to one or more fluid sources.

In one embodiment, the present invention is directed to a connector element for connecting a control unit to a plurality of temperature-regulated articles, including at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first fluid conduit connecting a fluid outlet of the at least one primary connector to a fluid inlet of a first one of the plurality of secondary connectors, at least one second fluid conduit connecting a fluid outlet of the first one of the plurality of secondary connectors to a fluid inlet of the second one of the plurality of secondary connectors, at least one third fluid conduit connecting a fluid inlet of the at least one primary connector to a fluid outlet of a second one of the plurality of secondary connectors, and at least one heating module configured to heat fluid within the at least one first fluid conduit and/or the at least one second fluid conduit.

In another embodiment, the present invention is directed to a connector element for connecting a control unit to a plurality of temperature-regulated articles, including at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first tube connecting a fluid outlet of the at least one primary connector to a fluid inlet of a first one of the plurality of secondary connectors, at least one second tube connecting a fluid inlet of the at least one primary connector to a fluid outlet of a second one of the plurality of secondary connectors, and at least one heating module configured to heat fluid within the at least one first tube.

In yet another embodiment, the present invention is directed to a system for heating or cooling a plurality of temperature-regulated articles with a single control unit, including a control unit, a plurality of temperature-regulated articles, at least one primary connector configured to connect to at least one fluid outlet and at least one fluid inlet of at least one control unit, a plurality of secondary connectors each configured to connect to at least one fluid outlet and at least one fluid inlet of one of a plurality of temperature-regulated articles, at least one first fluid conduit connecting a fluid outlet of the at least one primary connector to a fluid inlet of a first one of the plurality of secondary connectors, at least one second fluid conduit connecting a fluid outlet of the first one of the plurality of secondary connectors to a fluid inlet of the second one of the plurality of secondary connectors, at least one third fluid conduit connecting a fluid inlet of the at least one primary connector to a fluid outlet of a second one of the plurality of secondary connectors, and at least one heating module configured to heat fluid within the at least one first fluid conduit and/or the at least one second fluid conduit.

Prior systems such as those described in U.S. Pat. No. 10,986,933 and U.S. patent application Ser. No. 17/127,156, each of which is incorporated herein by reference in its entirety, describe devices such as mattress pads, weighted blankets, pillows, and/or other articles for facilitating sleep. These articles include internal chambers for facilitating the flow of fluid (e.g., water) through the articles. The fluid flows into the articles from a fluid source, or a "control unit," via conduits (e.g., tubing). The control unit heats and/or cools the fluid using thermoelectric modules such that the surface of the articles are able to be thermally regulated. However, it is often useful to utilize more than a single article for facilitating sleep. In particular, utilizing a thermally-regulated weighted blanket and a thermally-regulated mattress pad helps provide the benefits of a weighted blanket (namely the comfort of the weight), while reducing concerns of trapping excess heat under the blanket.

However, utilizing more than one article at once requires additional conduits for facilitating fluid flow. One solution to this problem is to utilize two separate fluid circuits, one for each article, with each fluid circuit having a separate control unit. However, this solution is often expensive, noisy (due to additional noise generated by the second control unit), and causes crowding in the sleeping area. A more effective solution is to utilize a single fluid circuit with a single control unit (or multiple control units in a single fluid circuit). However, an obstacle to this system is the lack of appropriate connectors for creating such a circuit. The control unit has a single input line and a single output line. A theoretical solution is to use a splitter attached to the input line and a splitter attached to the output line, effectively forming separate circuits for each device, but leading to a common fluid source. However, this system is flawed. In the instance where each device is able to retain much different volumes of fluid (i.e., for a mattress pad and pillow combination, or a weighted blanket and headgear combination), these separate circuits would cause the volume in the fluid source to vary wildly. It is therefore desirable to have a single fluid circuit for all articles.

Currently, there is no wye connector that provides for a single circuit between a fluid source and multiple articles and that includes quick disconnect connectors for the fluid source and each article. While splitters exist, splitters are not designed to form a single circuit loop and instead simply create two different fluid paths. Furthermore, there does not currently exist any connector including in-line heating and/or cooling using thermoelectric modules so as to prevent thermal loss during transit. There is therefore a need for such a connector in the market.

Referring now to the drawings in general, the illustrations are for the purpose of describing one or more preferred embodiments of the invention and are not intended to limit the invention thereto.

FIG. 1 illustrates a wye connector according to one embodiment of the present invention. The wye connector 100 includes a first fluid coupling element 102, a second fluid coupling element 104, and a third fluid coupling element 106. In one embodiment, the first fluid coupling element 102 is a female connector and the second fluid coupling element 104 and the third fluid coupling element 106 are male connectors, as shown in FIG. 1. However, one of ordinary skill in the art will understand that any of the first fluid coupling element 102, the second fluid coupling element 104, and the third fluid coupling element 106 are able to be male or female connectors in alternative embodiments of the present invention. The first fluid coupling element 102 is connected to the second fluid coupling element 104 via a first conduit 112. The second fluid coupling element 104 is connected to the third fluid coupling element 106 via a second conduit 114. The third fluid coupling element 106 is connected to the first fluid coupling element 102 via a third conduit 116. In one embodiment, the first conduit 112, the second conduit 114, and the third conduit 116 are tubes. In one embodiment, the first fluid coupling element 102, the second fluid coupling element 104, and/or the third fluid coupling element 106 are quick disconnect connectors, meaning that the connectors are easily able to be disconnected from a mating connector with, for example, a push of a button.

In one embodiment, the first conduit 112, the second conduit 114, and/or the third conduit 116 are formed from ether-based polyurethane. In one embodiment, the first conduit 112, the second conduit 114, and/or the third conduit 116 have inner diameters of approximately ⅜ inches. In one embodiment, the first conduit 112, the second conduit 114, and/or the third conduit 116 are insulated with an open-cell foam material in order to mitigate thermal losses from the system.

Each of the fluid coupling elements have ribbed protrusions configured to connect the fluid couplings to the conduits via frictional contact. Each of the ribbed protrusions are hollow, allowing fluid to move through the ribbed extensions and have a ribbed exterior for improved frictional contact with the conduits. The ribbed extensions extend outwardly from sides of the fluid coupling elements. The first fluid coupling element 102 includes a first ribbed protrusion 120 and a second ribbed protrusion 122. In one embodiment, as shown in FIG. 1, the first ribbed protrusion 120 and the second ribbed protrusion 122 extend from a single side of the first fluid coupling element 102. The second fluid coupling element 104 includes a first ribbed protrusion 130 and a second ribbed protrusion 132. In one embodiment, as shown in FIG. 1, the first ribbed protrusion 130 and the second ribbed protrusion 132 extend from a single side of the second fluid coupling element 104. The third fluid coupling element 106 includes a first ribbed protrusion 140 and a second ribbed protrusion 142. In one embodiment, as shown in FIG. 1, the first ribbed protrusion 140 and the second ribbed protrusion 142 extend from a single side of the third fluid coupling element 106.

In one embodiment, a first end of the first conduit 112 is frictionally connected to the second ribbed protrusion 122 of the first fluid coupling element 102 and a second end of the first conduit 112 is frictionally connected to the first ribbed protrusion 130 of the second fluid coupling element 104. A first end of the second conduit 114 is frictionally connected to the second ribbed protrusion 132 of the second fluid coupling element 104 and a second end of the second conduit 114 is frictionally connected to the first ribbed protrusion 140 of the third fluid coupling element 106. A first end of the third conduit 116 is frictionally connected to the second ribbed protrusion 142 of the third fluid coupling element 106 and a second end of the third conduit 116 is frictionally connected to the first ribbed protrusion 120 of the first fluid coupling element 102.

The second fluid coupling element 104 includes a first prong 134 and a second prong 136 operable to connect with first and second holes, respectively, of a corresponding female connector (i.e., a female connector attached to a thermally regulated article). The first prong 134 and the second prong 136 are hollow tubes, such that fluid entering the second fluid coupling element 104 passes through the first prong 134 and fluid exiting the second fluid coupling element 104 passes through the second prong 136. The third fluid coupling element 106 includes a first prong 144 and a second prong 146 operable to connect with first and second holes, respectively, of a corresponding female connector (i.e., a female connector attached to a thermally regulated article). The first prong 144 and the second prong 146 are hollow tubes, such that fluid entering the third fluid coupling element 106 passes through the first prong 144 and fluid exiting the third fluid coupling element 106 passes through the second prong 146.

A fluid path is defined through the wye connector beginning in the first fluid coupling element 102, through the second ribbed protrusion 122 and into the first conduit 112. The fluid flows from the first conduit 112 into the second fluid coupling element 104 through the first ribbed protrusion 130 and through the first prong 134 into a first device attached to second fluid coupling element 104. The fluid flows out of the first device through the second ribbed protrusion 132 and through the second prong 136 of the second fluid coupling element 104 into the second conduit 114. The fluid then flows from the second conduit 114 into the third fluid coupling element 106 and into a second device through the first ribbed protrusion 140 and through the first prong 144. The fluid exits the second device out of the third fluid coupling element 106 through the second ribbed protrusion 142 and through the second prong 146 into the third conduit 116. Finally, the fluid reenters into the fluid source through the first ribbed protrusion 120 of the first fluid coupling element 102, completing the closed circuit.

In one embodiment, at least one of the first conduit 112, second conduit 114, and/or third conduit 116 is attached to at least one heating element and/or at least one cooling element. In one embodiment, the at least one heating element and/or the at least one cooling element includes at least one thermoelectric module 150, operable to generate heat or absorb heat when a voltage is run across the at least one thermoelectric module 150 (in line with the Peltier Effect). Including an inline thermoregulating element such as the at least one thermoelectric module 150 is useful, as it allows the wye connector 100 to correct for thermal loss in the fluid as it passed through the first device or through the first conduit 112 and/or the second conduit 114. Therefore, the fluid traveling to the second device is more likely to be closer to an intended temperature. One of ordinary skill in the art will understand that the placement of the at least one thermoelectric module 150 is not limited to the second conduit 114 and, in another embodiment, at least one thermoelectric module 150 is attached to the first conduit 112 and/or the third conduit 116. In one embodiment, at least one thermoelectric module 150 is in network communication with at least one server and/or at least one user device. In one embodiment, the server and/or the at least one user device are operable to transmit a command to the at least one thermoelectric module 150 including at least one command for changing the temperature of the thermoelectric module 150 and/or turning the thermoelectric module 150 on or off.

In one embodiment, the first fluid coupling element 102 includes at least one button 124. When pressure is applied to the at least one button 124 (i.e., the at least one button 124 is pressed), the first fluid coupling element 102 is able to be attached to a mating connector and/or is able to be disconnected from a mating connector. One of ordinary skill in the art will understand that, in other embodiments of the present invention, the second fluid coupling element 104 and/or the third fluid coupling element 106 also include a quick disconnect button.

Figure 2:
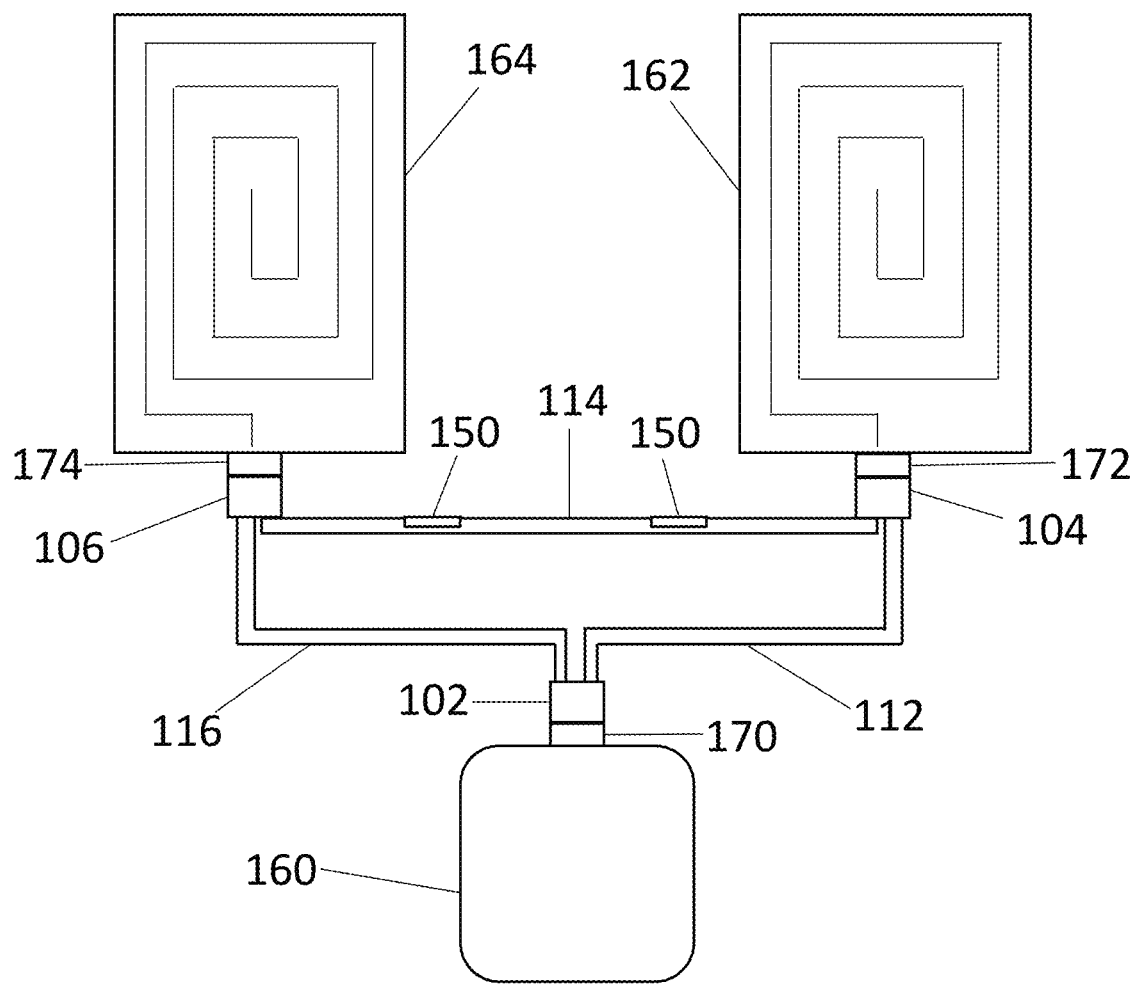
FIG. 2 illustrates a fluid exchange system having two thermally regulated articles and one fluid source according to one embodiment of the present invention.

FIG. 2 illustrates a fluid exchange system having two thermally regulated articles and one fluid source according to one embodiment of the present invention. A fluid source 160 includes a first mating coupling element 170 configured to matingly connect with the first fluid coupling element 102. Examples of fluid sources able to be used with the present invention are described in U.S. Pat. Nos. 11,013,339 and 11,013,883 and U.S. patent application Ser. Nos. 17/226,749 and 17/702,436, each of which is incorporated herein by reference in its entirety. In one embodiment, the first mating coupling element 170 is a male connector and the first fluid coupling element 102 is a female connector. In another embodiment, the first mating coupling element 170 is a female connector and the first fluid coupling element 102 is a male connector. In one embodiment, the fluid 160 includes one or more thermoelectric modules configured to heat and/or cool the fluid. In one embodiment, the fluid is water. In another embodiment, the fluid is air. The fluid source 160 is connected to a first device 162 via a first conduit 112. A first device 162 is connected to a second mating coupling element 172 configured to matingly connect with the second fluid coupling element 104. In one embodiment, the second mating coupling element 172 is a female connector and the second fluid coupling element 104 is a male connector. In another embodiment, the second mating coupling element 172 is a male connector and the second fluid coupling element 104 is a female connector. In one embodiment, the first device 162 includes one or more internal fluid channels. Fluid enters the one or more internal fluid channels through the second mating coupling element 172 and exits the one or more internal fluid channels through the second mating coupling element 172. The first device 162 is connected to a second device 164 via a second conduit 114. The second device 164 is connected to a third mating coupling element 174 configured to matingly connect with the third fluid coupling element 106. In one embodiment, the third mating coupling element 174 is a female connector and the third fluid coupling element 106 is a male connector. In another embodiment, the third mating coupling element 174 is a male connector and the third fluid coupling element 106 is a female connector. In one embodiment, the second device 164 includes one or more internal fluid channels. Fluid enters the one or more internal fluid channels through the third mating coupling element 174 and exits the one or more internal fluid channels through the third mating coupling element 174. Examples of devices with internal fluid channels that are able to be used with the present invention include, but are not limited to, those disclosed by U.S. Pat. No. 11,013,883 and U.S. patent application Ser. No. 17/127,156, each of which are incorporated herein by reference in its entirety. The second device 164 is connected to the fluid source 160 via a third conduit 116.

Figure 3:
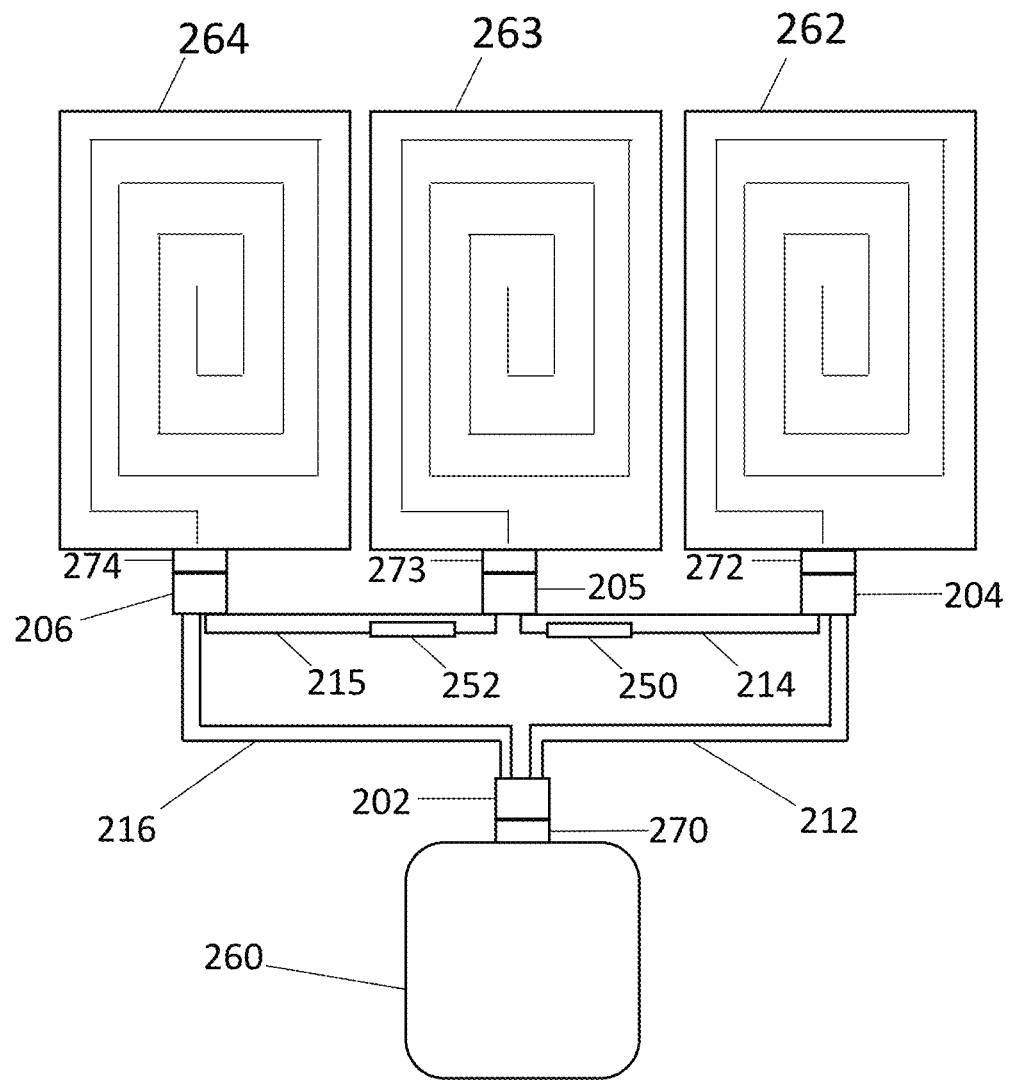
FIG. 3 illustrates a fluid exchange system having three thermally regulated articles and one fluid source according to one embodiment of the present invention.

FIG. 3 illustrates a fluid exchange system having three thermally regulated articles and one fluid source according to one embodiment of the present invention. One of ordinary skill in the art will understand that the wye connector disclosed by the present invention is not limited to connecting two devices to a single fluid source. Instead, the wye connector is able to be adapted to include any number of fluid coupling elements, and therefore be connected to any number of devices. Therefore, one of ordinary skill in the art will understand that although FIG. 3 shows only three devices connected to a fluid source 260, embodiments of the present invention are able to include any number of devices (i.e., 4, 5, 10, 15, 20, etc.) connected to one or more fluid sources. A fluid source 260 includes a first mating coupling element 270 configured to matingly connect to a first fluid coupling element 202. The fluid source 260 is connected to a first device 262 via a first conduit 212. The first device 262 includes a second mating coupling element 272 configured to matingly connect to a second fluid coupling element 204. The first device 262 is connected to a second device 263 via a second conduit 214. The second device 263 includes a third mating coupling element 273 configured to matingly connect to a third fluid coupling element 205. The second device 263 is connected to a third device 264 via a third conduit 215. The third device 264 includes a fourth mating coupling element 274 configured to matingly connect with a fourth fluid coupling element 206. Finally, the third device 264 is connected to the fluid source 260 via a fourth conduit 216.

Like the wye connector shown in FIG. 1, the wye connector shown in FIG. 3 is able to include one or more thermoelectric modules 250, 252 connected to the first conduit 212, the second conduit 214, the third conduit 215, and/or the fourth conduit 216.

Figure 4:
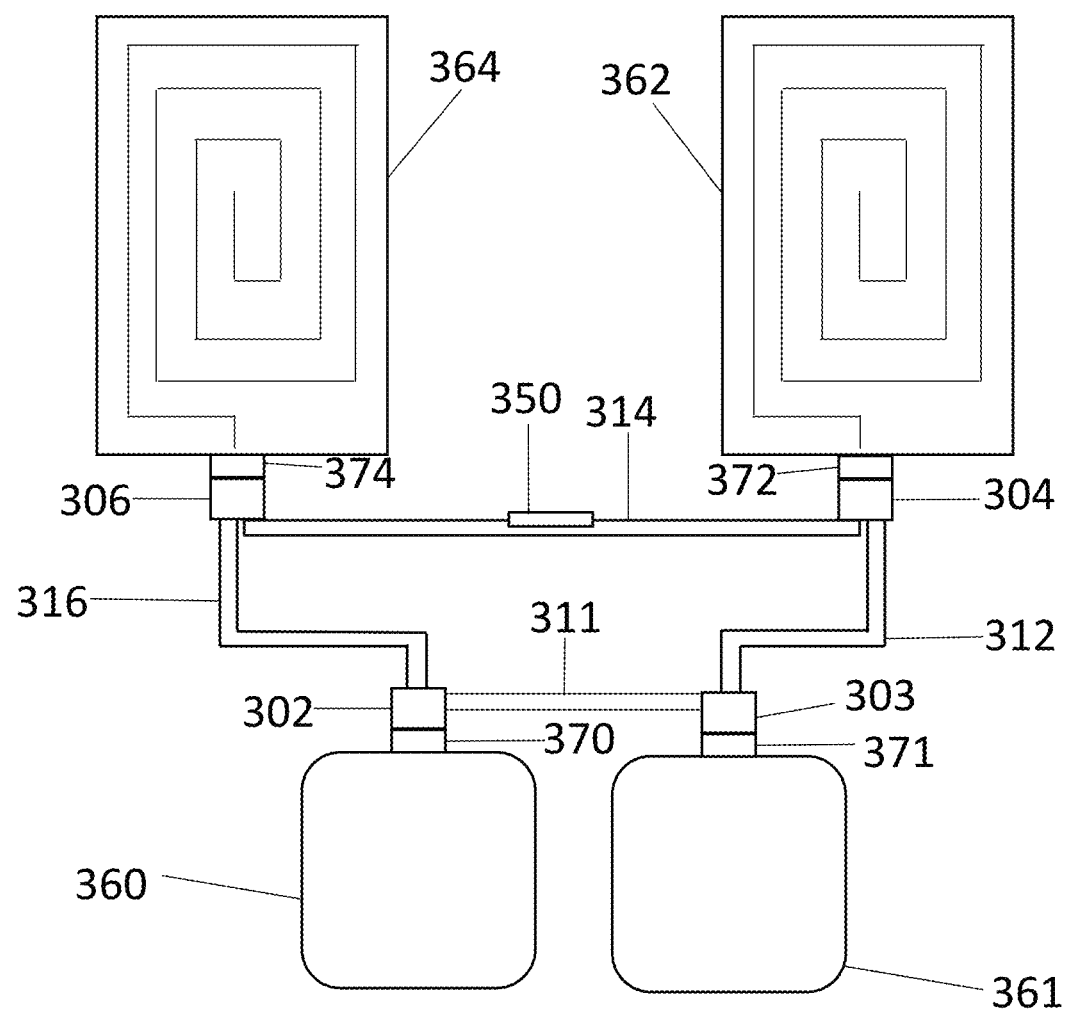
FIG. 4 illustrates a fluid exchange system having two thermally regulated articles and two fluid sources according to one embodiment of the present invention.

FIG. 4 illustrates a fluid exchange system having two thermally regulated articles and two fluid sources according to one embodiment of the present invention. Furthermore, one of ordinary skill in the art will understand that the present invention is not limited to including a single fluid source. This is especially useful, for instance, in situations in which more fluid is needed to fill the fluid circuit. Instead of needing to obtain a larger fluid source to accommodate a new system, multiple smaller fluid sources are able to be stringed along, potentially reducing cost and effort in updating the system. A first fluid source 360 includes a first mating coupling element 370 configured to matingly connect with a first fluid coupling element 302. The first fluid source 360 is connected to a second fluid source 361 via a first conduit 311. The second fluid source 361 includes a second mating coupling element 371 configured to matingly connect with a second fluid coupling element 303. The second fluid source 361 is connected to a first device 362 via a second conduit 312. The first device 362 includes a third mating coupling element 372 configured to matingly connect with a third fluid coupling element 304. The first device 362 is connected to a second device 364 via a third conduit 314. The second device 364 includes a fourth mating coupling element 374 configured to matingly connect with a fourth fluid coupling element 306. Finally, the second device 364 is connected to the first fluid source 360 via a fourth conduit 316. In one embodiment, the first conduit 311, the second conduit 312, the third conduit 314, and/or the fourth conduit 316 is attached to at least one thermoelectric module 350 operable to heat and/or cool fluid traveling through the conduits.

In one embodiment, the plurality of temperature-regulated articles configured to connect to the wye connector include mattresses, mattress pads, blankets (e.g., weighted blankets), pillows, pillow cases, and/or other thermally regulated articles.

Figure 5:
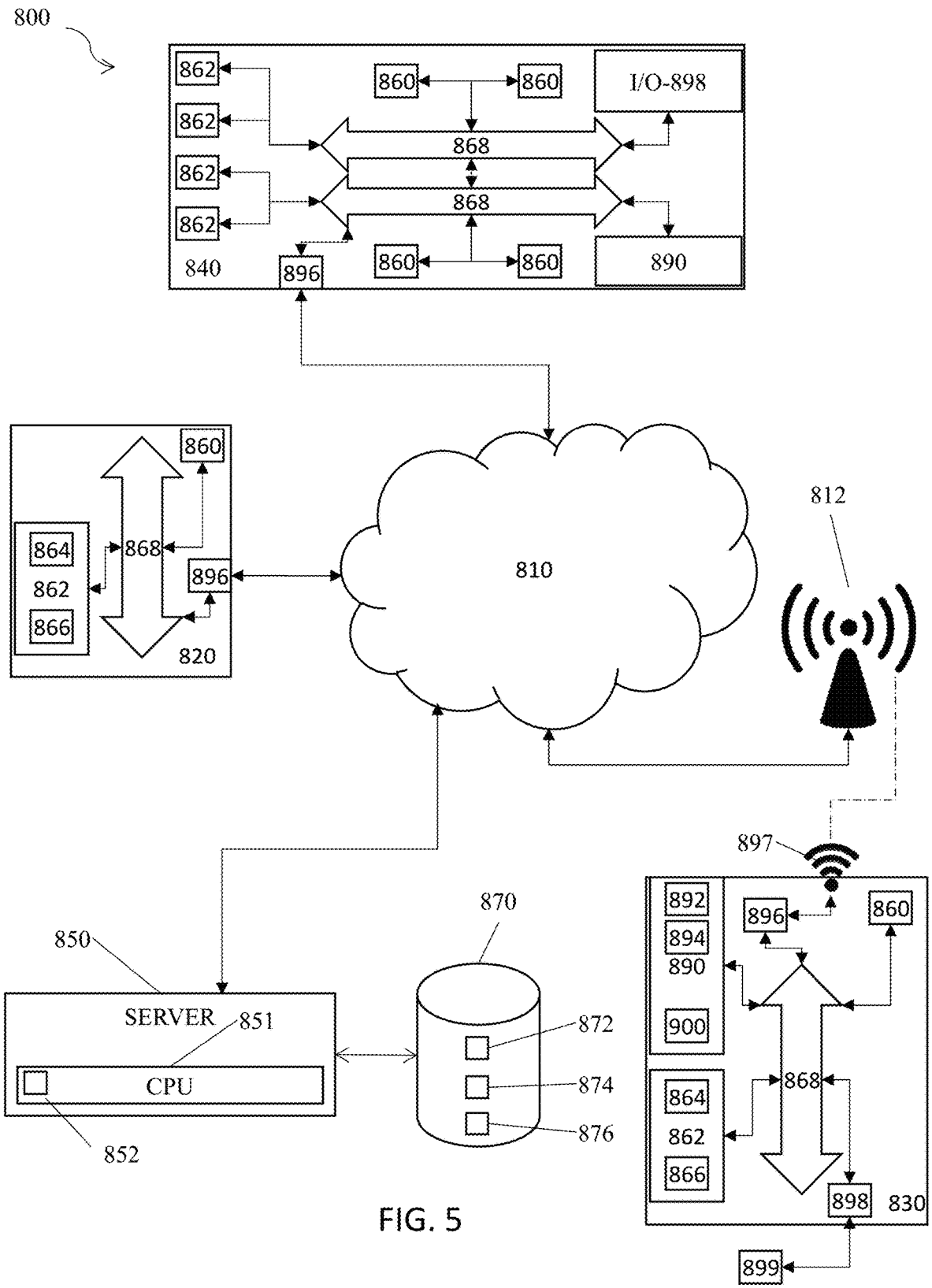
FIG. 5 is a schematic diagram of a system of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A connector element for connecting a control unit to a plurality of temperature-regulated articles, comprising:
   at least one primary connector configured to connect to at least one fluid outlet and at least one fluid inlet of at least one control unit;
   a plurality of secondary connectors each configured to connect to at least one fluid outlet and at least one fluid inlet of one of a plurality of temperature-regulated articles;
   at least one first fluid conduit connecting a fluid outlet of the at least one primary connector to a fluid inlet of a first one of the plurality of secondary connectors;
   at least one second fluid conduit connecting a fluid outlet of the first one of the plurality of secondary connectors to a fluid inlet of the second one of the plurality of secondary connectors;
   at least one third fluid conduit connecting a fluid inlet of the at least one primary connector to a fluid outlet of a second one of the plurality of secondary connectors; and
   at least one heating module configured to heat fluid within the at least one second fluid conduit.

2. The connector element of claim 1, wherein the at least one heating module includes at least one thermoelectric element.

3. The connector element of claim 1, wherein the at least one first fluid conduit, the at least one second fluid conduit, and/or the at least one third fluid conduit include at least one hollow tube.

4. The connector element of claim 3, wherein the at least one hollow tube includes polyurethane.

5. The connector element of claim 1, wherein the fluid inlet and/or the fluid outlet of the at least one primary connector includes at least one ribbed protrusion extending outwardly from a base of the at least one primary connector.

6. The connector element of claim 5, wherein the at least one first fluid conduit and/or the at least one third fluid conduit are frictionally engaged with the at least one ribbed protrusion of the at least one primary connector.

7. The connector element of claim 1, wherein the at least one primary connector includes a quick release mechanism.

8. The connector element of claim 1, wherein the plurality of temperature-regulated articles includes at least one mattress pad, at least one pillow, and/or at least one blanket.

9. A connector element for connecting a control unit to a plurality of temperature-regulated articles, comprising:
   at least one primary connector configured to connect to at least one fluid outlet and at least one fluid inlet of at least one control unit;
   a plurality of secondary connectors each configured to connect to at least one fluid outlet and at least one fluid inlet of one of a plurality of temperature-regulated articles;
   at least one first tube connecting a fluid outlet of the at least one primary connector to a fluid inlet of a first one of the plurality of secondary connectors;
   at least one second tube connecting a fluid inlet of the at least one primary connector to a fluid outlet of a second one of the plurality of secondary connectors; and
   at least one heating module configured to heat fluid within the at least one second tube.

10. The connector element of claim 9, wherein at least one third tube connects a fluid outlet of the first one of the plurality of secondary connectors to a fluid inlet of a third one of the plurality of secondary connectors, and wherein at least one fourth tube connects a fluid outlet of the third one of the plurality of secondary connectors to a fluid inlet of the second one of the plurality of secondary connectors.

11. The connector element of claim 9, wherein the at least one first tube and/or the at least one second tube include polyurethane.

12. The connector element of claim 9, wherein the fluid inlet and/or the fluid outlet of the at least one primary connector includes at least one ribbed protrusion extending outwardly from a base of the at least one primary connector.

13. The connector element of claim 12, wherein the at least one first tube and/or the at least one second tube are frictionally engaged with the at least one ribbed protrusion of the at least one primary connector.

14. The connector element of claim 9, wherein the at least one primary connector includes a quick release mechanism.

15. The connector element of claim 9, wherein the plurality of temperature-regulated articles includes at least one mattress pad, at least one pillow, and/or at least one blanket.

16. A system for heating or cooling a plurality of temperature-regulated articles with a single control unit, comprising:

a control unit;

a plurality of temperature-regulated articles;

at least one primary connector configured to connect to at least one fluid outlet and at least one fluid inlet of at least one control unit;

a plurality of secondary connectors each configured to connect to at least one fluid outlet and at least one fluid inlet of one of a plurality of temperature-regulated articles;

at least one first fluid conduit connecting a fluid outlet of the at least one primary connector to a fluid inlet of a first one of the plurality of secondary connectors;

at least one second fluid conduit connecting a fluid outlet of the first one of the plurality of secondary connectors to a fluid inlet of the second one of the plurality of secondary connectors;

at least one third fluid conduit connecting a fluid inlet of the at least one primary connector to a fluid outlet of a second one of the plurality of secondary connectors; and at least one heating module configured to heat fluid within the at least one second fluid conduit.

17. The system of claim 16, wherein the at least one heating module includes at least one thermoelectric element.

18. The system of claim 16, wherein fluid inlet and/or the fluid outlet of the at least one primary connector includes at least one ribbed protrusion extending outwardly from a base of the at least one primary connector.

19. The system of claim 16, wherein the at least one primary connector includes a quick release mechanism.

20. The system of claim 16, wherein the plurality of temperature-regulated articles includes at least one mattress pad, at least one pillow, and/or at least one blanket.

* * * * *